(12) United States Patent
Yamaguchi et al.

(10) Patent No.: US 7,514,303 B2
(45) Date of Patent: Apr. 7, 2009

(54) METHOD OF FABRICATING REFLECTION TYPE LIQUID CRYSTAL DISPLAY

(75) Inventors: Yuichi Yamaguchi, Tokyo (JP); Hironori Kikkawa, Tokyo (JP); Hiroshi Kanoh, Tokyo (JP); Teruaki Suzuki, Tokyo (JP); Hidenori Ikeno, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 46 days.

(21) Appl. No.: 11/636,441

(22) Filed: Dec. 11, 2006

(65) Prior Publication Data

US 2007/0082436 A1   Apr. 12, 2007

Related U.S. Application Data

(62) Division of application No. 11/030,188, filed on Jan. 7, 2005, now Pat. No. 7,220,625, which is a division of application No. 09/987,013, filed on Nov. 13, 2001, now Pat. No. 6,862,056.

(30) Foreign Application Priority Data

Nov. 10, 2000   (JP)   .............................. 2000-343714

(51) Int. Cl.
*H01L 21/84*   (2006.01)
(52) U.S. Cl. .................. 438/151; 438/30; 349/113; 349/138; 257/E21.413; 257/E21.414
(58) Field of Classification Search .............. 438/151, 438/30; 349/113, 138
See application file for complete search history.

(56) References Cited

U.S. PATENT DOCUMENTS

| 5,500,750 A | 3/1996 | Kanbe et al. |
| 5,973,843 A | 10/1999 | Nakamura |
| 6,064,456 A | 5/2000 | Taniguchi et al. |
| 6,097,459 A | 8/2000 | Shimada et al. |
| 6,108,064 A | 8/2000 | Minoura et al. |
| 6,195,140 B1 | 2/2001 | Kubo et al. |

(Continued)

FOREIGN PATENT DOCUMENTS

EP        617310       9/1994

(Continued)

OTHER PUBLICATIONS

Notification of Re-Examination Opinion, Taiwanese Patent Office, Jun. 11, 2007.

*Primary Examiner*—A. Sefer
(74) *Attorney, Agent, or Firm*—Young & Thompson

(57) ABSTRACT

A liquid crystal display device includes (a) a first substrate, (b) a second substrate spaced away from and facing the first substrate, (c) a liquid crystal layer sandwiched between the first and second substrates, (d) a transistor formed on the first substrate, (e) a wiring layer formed on the first substrate and electrically connected to the transistor, (f) a reflection electrode formed on the first substrate, an external incident light being reflected at the reflection electrode towards a viewer, and (g) a compensation layer formed directly on the wiring layer. The reflection electrode does not cover the wiring layer therewith, and the compensation layer has almost the same height as a height of the reflection electrode, the height being measured from a surface of the first substrate.

16 Claims, 10 Drawing Sheets

U.S. PATENT DOCUMENTS

| | | |
|---|---|---|
| 6,215,538 B1 | 4/2001 | Narutaki et al. |
| 6,341,002 B1 | 1/2002 | Shimizu et al. |
| 6,342,935 B1 | 1/2002 | Jang et al. |
| 6,373,540 B1 | 4/2002 | Munakata |
| 6,476,889 B2 | 11/2002 | Urabe et al. |
| 6,522,375 B1 | 2/2003 | Jang et al. |
| 7,215,394 B2 * | 5/2007 | Kanou et al. ................ 349/113 |
| 2001/0010571 A1 * | 8/2001 | Kanou et al. ................ 349/113 |
| 2002/0075432 A1 | 6/2002 | Yamaguchi et al. |
| 2002/0118326 A1 | 8/2002 | Sakamoto et al. |

FOREIGN PATENT DOCUMENTS

| | | |
|---|---|---|
| JP | 54-37697 | 3/1979 |
| JP | 62/229231 | 10/1987 |
| JP | 5-173158 | 7/1993 |
| JP | 6-75238 | 3/1994 |
| JP | 6075238 | 3/1994 |
| JP | 6-342153 | 12/1994 |
| JP | 7-321329 | 12/1995 |
| JP | (02) 23779875 | 6/1996 |
| JP | 11-281972 | 10/1999 |
| JP | 2000-122093 | 4/2000 |
| JP | 2000-147481 | 5/2000 |
| JP | 2000-147543 | 5/2000 |
| JP | 2000-214475 | 8/2000 |
| JP | 2000-250027 | 9/2000 |
| JP | 2001-201742 | 7/2001 |

* cited by examiner

MASK PATTERN WIDTH 4μm

MASK PATTERN WIDTH 10μm

METHOD OF FABRICATING REFLECTION TYPE LIQUID CRYSTAL DISPLAY

This application is a division of co-pending application Ser. No. 11/030,188, filed on Jan. 7, 2005. Ser. No. 11/030,188 is a division of co-pending application Ser. No. 09/987,013, filed on Nov. 13, 2001, which claims priority to prior Japanese Application No. 2000-343714, filed on Nov. 10, 2000, the entire contents of which are hereby incorporated by reference.

BACKGROUND OF THE INVENTION

1. Field of the Invention

The invention relates to a liquid crystal display device and a method of fabricating the same, and more particularly to a reflection type liquid crystal display device in which an external incident light is reflected towards a viewer such that the reflected light acts as a light source, and a method of fabricating the same.

2. Description of the Related Art

As one of liquid crystal display devices, there is known a reflection type liquid crystal display device. The reflection type liquid crystal display device includes a reflection layer at which an external incident light is reflected towards a viewer, and hence, is not necessary to include a back light source unlike a transmission type liquid crystal display device which has to include a back light source as a light source.

FIG. 1 is partial cross-sectional view of a conventional reflection type liquid crystal display device.

As illustrated in FIG. 1, the reflection type liquid crystal display device 1 is comprised of a lower substrate 2, an opposing substrate 4 spaced away from and facing the lower substrate 2, and a liquid crystal layer 3 sandwiched between the lower and opposing substrates 2 and 4.

The lower substrate 2 includes an electrically insulating substrate 2a, a semiconductor device 5, a drain wiring 6, projections 7, an electrically insulating layer 8, and a reflection electrode 9. The semiconductor device 5 and drain wiring 6 are formed on the substrate 2a, and the projections 7 are formed on the substrate 2a in a pattern. The electrically insulating layer 8 covers the semiconductor device 5, the drain wiring 6 and the projections 7 therewith. The reflection electrode 9 is formed directly on the electrically insulating layer 8.

The opposing substrate 4 includes an electrically insulating substrate 4a, and a transparent electrode 4b formed on the substrate 4a and facing the liquid crystal layer 3.

The electrically insulating layer 8 is composed of organic material, inorganic material or a combination of organic and inorganic materials. The electrically insulating layer 8 formed on the drain wiring 6 acts as a passivation layer for protecting the semiconductor device 5.

The conventional reflection type liquid crystal display device 1 is accompanied with a problem as follows.

Since the drain wiring 6 is covered only with the thin electrically insulating layer 8, a light reflected at the drain wiring 6 is unavoidably yellowish in color, resulting in harmful influence to the display characteristic of the reflection type liquid crystal display device 1.

FIG. 2 illustrates how lights are reflected in the reflection type liquid crystal display device 1.

As illustrated in FIG. 2, incident lights Lia and Lib pass through the opposing substrate 4 and the liquid crystal layer 3, reach the lower substrate 2, and are reflected at the lower substrate 2. The reflected lights Lra and Lrb pass through the liquid crystal layer 3 again, and leave the opposing substrate 4.

Since the drain wiring 6 is covered only with the thin insulating layer 8 composed of metal, a space between the drain wiring 6 and the opposing substrate 4 is greater than a space between the reflection electrode 9 and the opposing substrate 4. As a result, the light Lrb reflected at the drain wiring 6 would have a greater birefringence rate ($\Delta n \times d$) than that of the light Lra reflected at the reflection electrode 9, and accordingly, the reflected light Lrb would be yellowish. This causes a problem that when the liquid crystal display device displays a white image, the white image would be yellowish.

Japanese Unexamined Patent Publication No. 6-75238 has suggested a liquid crystal display device including a first transparent substrate, a second transparent substrate facing the first transparent substrate, a liquid crystal layer sandwiched between the first and second transparent substrates, a plurality of reflections electrodes formed on the first transparent substrate for reflecting an incident light having passed through the second transparent substrate, voltage-applying electrodes which apply a voltage to each of the reflection electrodes, and a light-permeable common electrode formed almost all over the second electrode. The reflection electrodes cover the first transparent substrate therewith except portions through which the reflection electrodes are connected to each other above the voltage-applying electrodes, and are formed on an electrically insulating film having a plurality of projections, only in an area in which the reflection electrodes are formed such that the reflection electrodes do not overlap the voltage-applying electrodes.

Japanese Unexamined Patent Publication No. 2001-201742 having been published on Jul. 27, 2001 has suggested a liquid crystal display device including a first transparent substrate, a transparent electrode formed on the first transparent substrate, a second substrate, an electrically insulating film formed on the second substrate and having a wavy surface, a reflection electrode formed on the electrically insulating film and having a surface reflecting the wavy surface of the electrically insulating film, and a liquid crystal layer sandwiched between the first and second substrates. The electrically insulating film is comprised of a first insulating layer having a plurality of non-uniformly arranged recessed portions defined by raised portions surrounding the recessed portions, and a second insulating layer entirely covering the first insulating layer therewith.

The above-mentioned problem remains unsolved even in the above-mentioned Publications.

It should be noted that Japanese Unexamined Patent Publication No. 2001-201742 constitutes statutory prior art to the present invention. The applicant refers to the Publication No. 2001-201742 only for the purpose of explanation of the present invention, and the reference to the Publication No. 2001-201742 does not mean that the applicant admits that the Publication No. 2001-201742 constitutes statutory prior art to the present invention.

SUMMARY OF THE INVENTION

In view of the above-mentioned problem in the conventional liquid crystal display devices, it is an object of the present invention to provide a liquid crystal display device which is capable of preventing a reflected light from becoming yellowish to thereby prevent a white image displayed in a liquid crystal display device from becoming yellowish. It is also an object of the present invention to provide a method of fabricating such a liquid crystal display device.

In one aspect of the present invention, there is provided a liquid crystal display device including (a) a first substrate, (b) a second substrate spaced away from and facing the first substrate, (c) a liquid crystal layer sandwiched between the first and second substrates, (d) a transistor formed on the first substrate, (e) a wiring layer formed on the first substrate and electrically connected to the transistor, (f) a reflection electrode formed on the first substrate, an external incident light being reflected at the reflection electrode towards a viewer, and (g) a compensation layer formed directly on the wiring layer, the reflection electrode not overlapping the wiring layer, the compensation layer having almost the same height as a height of the reflection electrode, the height being measured from a surface of the first substrate.

The liquid crystal display device may further include an electrically insulating film having a wavy surface, and wherein the reflection electrode is formed on the electrically insulating film and has a surface reflecting the wavy surface of the electrically insulating film.

For instance, the electrically insulating film may be comprised of a projection formed on the first substrate, and an insulating layer covering the projection therewith.

It is preferable that the electrically insulating film is formed also on the wiring layer as the compensation layer in which the projection is formed on the wiring layer.

It is preferable that the electrically insulating film formed on the wiring layer has a height greater than a height of a lowest portion of the wavy surface of the electrically insulating film.

For instance, the compensation layer is comprised of a projection formed on the wiring layer, and an insulating layer covering the projection therewith.

It is preferable that the reflection electrode and the wiring layer do not overlap each other.

It is preferable that the reflection electrode has ends located above and in alignment with opposite ends of the wiring layer.

The liquid crystal display device may further include thin film transistors each acting as a switching device and each applied to each of pixels.

It is preferable that the projection is comprised of a first projection defining a rectangular frame, and a second projection defining a plurality of linear projections each extending in different directions from one another within the rectangular frame.

It is preferable that the first projection is formed on the wiring layer.

It is preferable that the first projection has a greater width than a width of the linear projections.

In another aspect of the present invention, there is provided a method of fabricating a liquid crystal display device including a first substrate, a second substrate spaced away from and facing the first substrate, a liquid crystal layer sandwiched between the first and second substrates, and a reflection electrode formed on the first substrate, an external incident light being reflected at the reflection electrode towards a viewer, the method including the steps of (a) forming a switching device and a wiring layer on the first substrate, the wiring layer being electrically connected to the switching device, (b) forming a first projection on the wiring layer and second projections on the first substrate, (c) covering the first and second projections with an electrically insulating layer, (d) forming an electrically conductive film over the electrically insulating layer, and (e) patterning the electrically conductive film such that the electrically conductive film does not overlap the wiring layer.

For instance, the step (e) may include the steps of (e1) forming a photoresist layer over the electrically conductive film, (e2) forming a hole throughout the photoresist layer above the wiring layer, the hole reaching the electrically conductive film, and (e3) etching the electrically conductive film such that an etched portion of the electrically conductive film has a length greater than a width of the hole.

It is preferable that the first projection and the electrically insulating layer are formed to have almost the same height as a height of the second projections, the electrically insulating layer and the electrically conductive film.

It is preferable that the electrically insulating layer is formed to have a wavy surface, and the electrically conductive film is formed to have a surface reflecting the wavy surface of the electrically insulating layer.

It is preferable that the electrically conductive film is formed to have ends located above and in alignment with opposite ends of the wiring layer.

It is preferable that the first projection defines a rectangular frame, and the second projections define a plurality of linear projections each extending in different directions from one another within the rectangular frame.

It is preferable that the first projection is formed to have a greater width than a width of the linear projections.

The advantages obtained by the aforementioned present invention will be described hereinbelow.

In accordance with the present invention, the compensation layer formed on the wiring layer is designed to have almost the same height as a height of the reflection electrode. Herein, the height is measured from a surface of the first substrate. Hence, a space between the reflection electrode and the second substrate is almost equal to a space between the compensation layer and the second substrate. This ensures that a light reflected at the compensation layer is prevented from being yellowish, further ensuring a white image displayed in a screen of the liquid crystal display device is prevented from being yellowish.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 3:
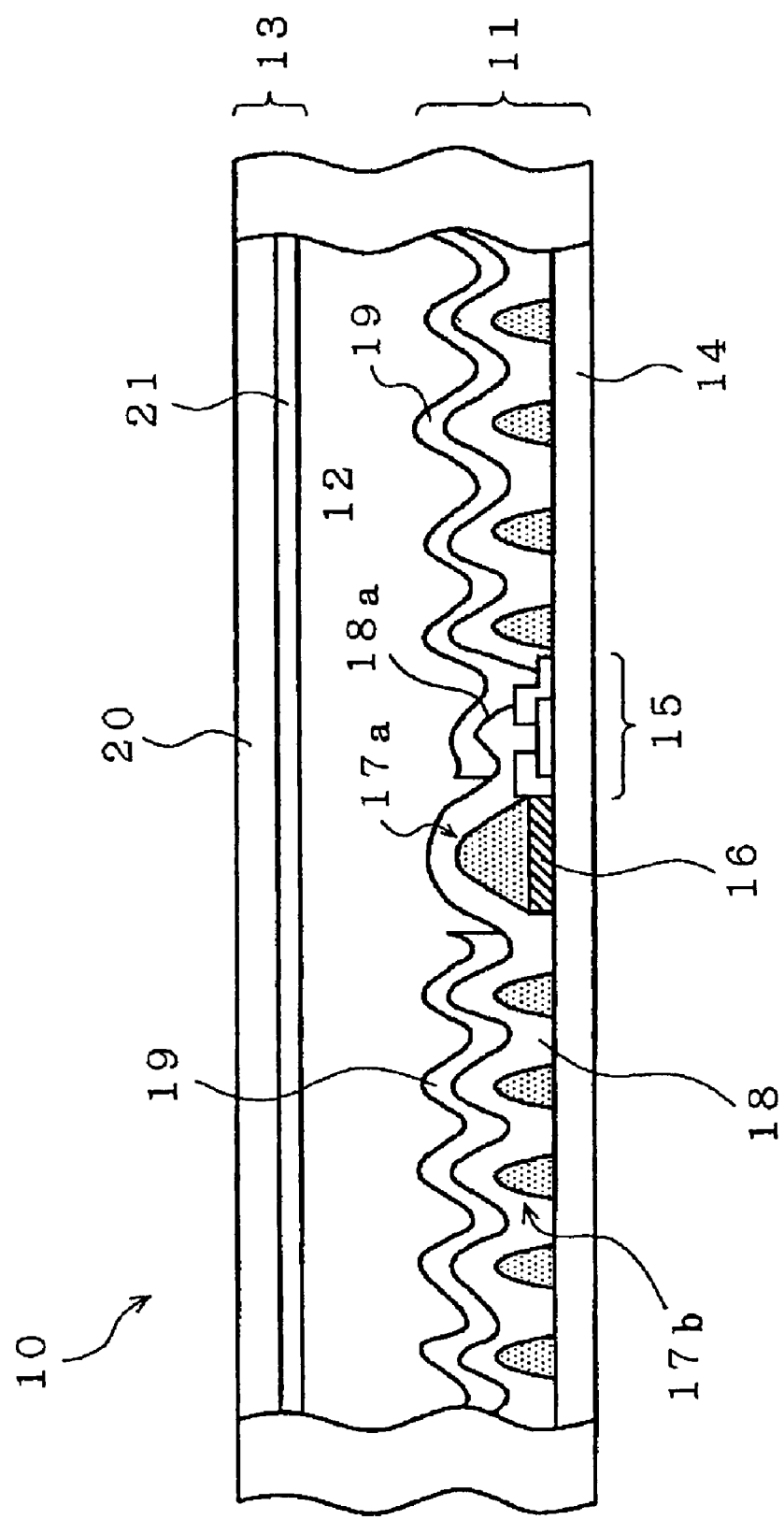
FIG. 3 is a partial cross-sectional view of the liquid crystal display device in accordance with the first embodiment of the present invention.

FIG. 3 is a partial cross-sectional view of the liquid crystal display device in accordance with the first embodiment of the present invention.

As illustrated in FIG. 3, the liquid crystal display device 10 is comprised of a lower substrate 11, an opposing substrate 13 spaced away from and facing the lower substrate 11, and a liquid crystal layer 12 sandwiched between the lower and opposing substrates 11 and 13.

The liquid crystal display device 10 is designed to include a thin film transistor (TFT) as a switching device in each of pixels. That is, the liquid crystal display device 10 is an active matrix type liquid crystal display device.

The lower substrate 11 includes a first electrically insulating substrate 14, a thin film transistor 15, a drain wiring 16, a compensation layer formed on the drain wiring 16 and comprised of a first projection 17a and a later mentioned electrically insulating layer 18 covering the first projection 17a therewith, a plurality of second projections 17b formed on the first electrically insulating substrate 14, an electrically insulating layer 18 covering the first electrically insulating substrate 14, the thin film transistor 15, the first projection 17a and the second projections 17b therewith, and a reflection electrode 19 formed on the electrically insulating layer 18 such that the reflection electrode 19 does not overlap the wiring layer 16 therewith.

The thin film transistor 15 and the drain wiring 16 are formed on the first substrate 14, and the second projections 17b are formed on the first substrate 14 in a pattern as mentioned later. The electrically insulating layer 18 is formed with a contact hole 18a therethrough reaching a source electrode of the thin film transistor 15.

The first projection 17a formed on the drain wiring 16 is covered only with the electrically insulating layer 18, whereas the second projections 17b are covered with both the electrically insulating layer 18 and the reflection electrode 19.

The reflection electrode 19 is electrically connected to a source or drain electrode (not illustrated), and act as a reflector and a pixel electrode. An incident light passing through the opposing electrode 13 is reflected at the reflection electrode 19 towards a viewer. That is, the thus reflected light acts as a light source.

The opposing substrate 13 includes a second electrically insulating substrate 20, and a transparent electrode 21 formed on the second substrate 20 and facing the liquid crystal layer 12.

A light enters the second substrate 13, passes through the liquid crystal layer 12, reaches the lower substrate 11, is reflected at the lower substrate 11, passes through the liquid crystal layer 12 again, and leaves the liquid crystal display device 10 through the second substrate 20.

Figure 4:
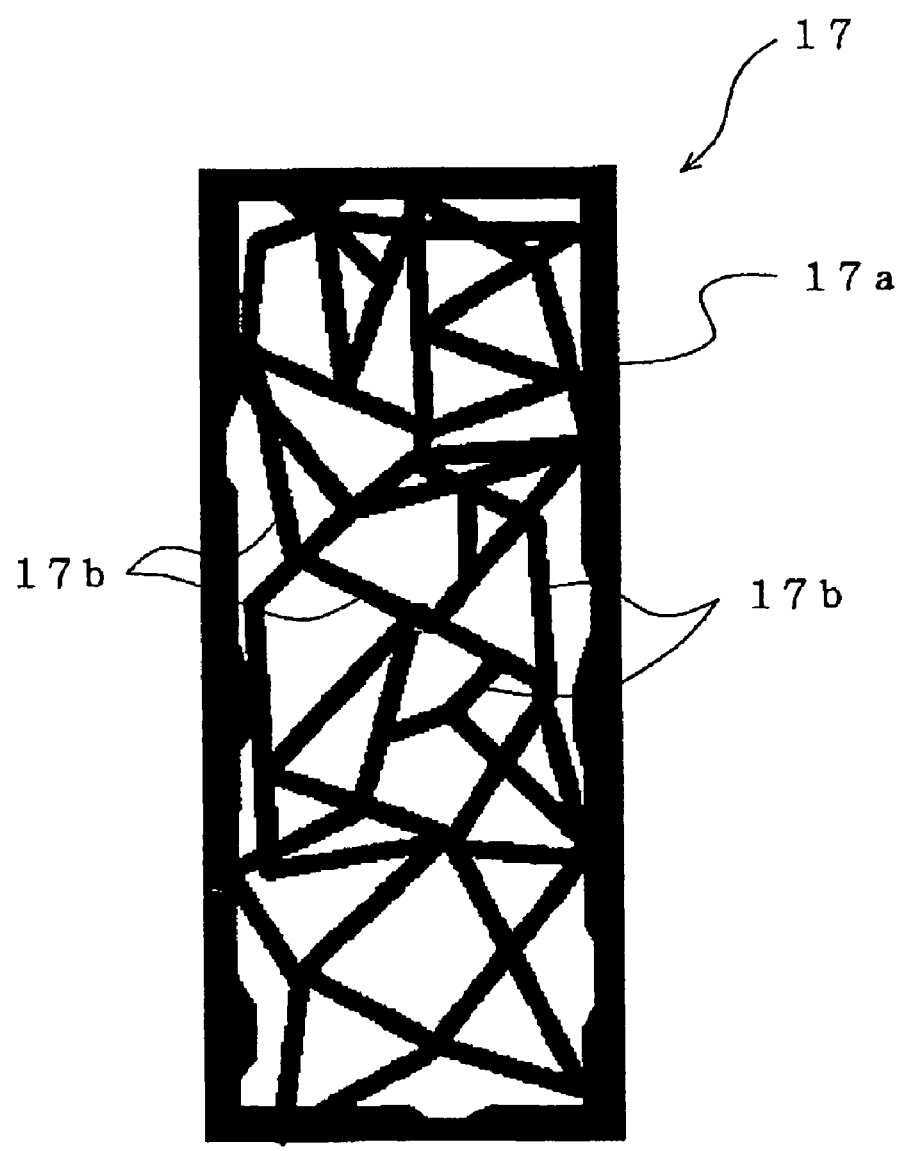
FIG. 4 is a plan view of a pattern of projection within a pixel in the liquid crystal display illustrated in FIG. 3.

FIG. 4 is a plan view of a pattern of the first projection 17a and the second projections 17b.

As illustrated in FIG. 4, the first projection 17a defines a rectangular frame associated with a pixel, and the second projections 17b is comprised of a plurality of linear projections each extending in different directions from one another within the rectangular frame defined by the first projection 17a.

Since the first and second projections 17a and 17b are formed in such a pattern as illustrated in FIG. 4, the electrically insulating film 18 covering the first and second projections 17a and 17b has a wavy surface reflecting the first and second projections 17a and 17b, and further, the reflection electrode 19 has a wavy surface reflecting the wavy surface of the electrically insulating film 18.

The first projection 17a is designed to have a width greater than a width of the second projections 17b such that the first projection 17a can entirely cover the drain wiring 16 therewith. The electrically insulating film 18 covers both the first and second projections 17a and 17b therewith.

The electrically insulating film 18 is composed of organic material, inorganic material or a combination of organic and inorganic materials, and is equal to or greater in height than the second projections 17b.

Above the drain wiring 16 are formed the first projection 17a and the electrically insulating film 18. As illustrated in FIG. 3, the electrically insulating film 18 has a rounded summit, and has a height greater than a height of a lowest portion of the wavy surface of the electrically insulating film 18.

Figure 5:
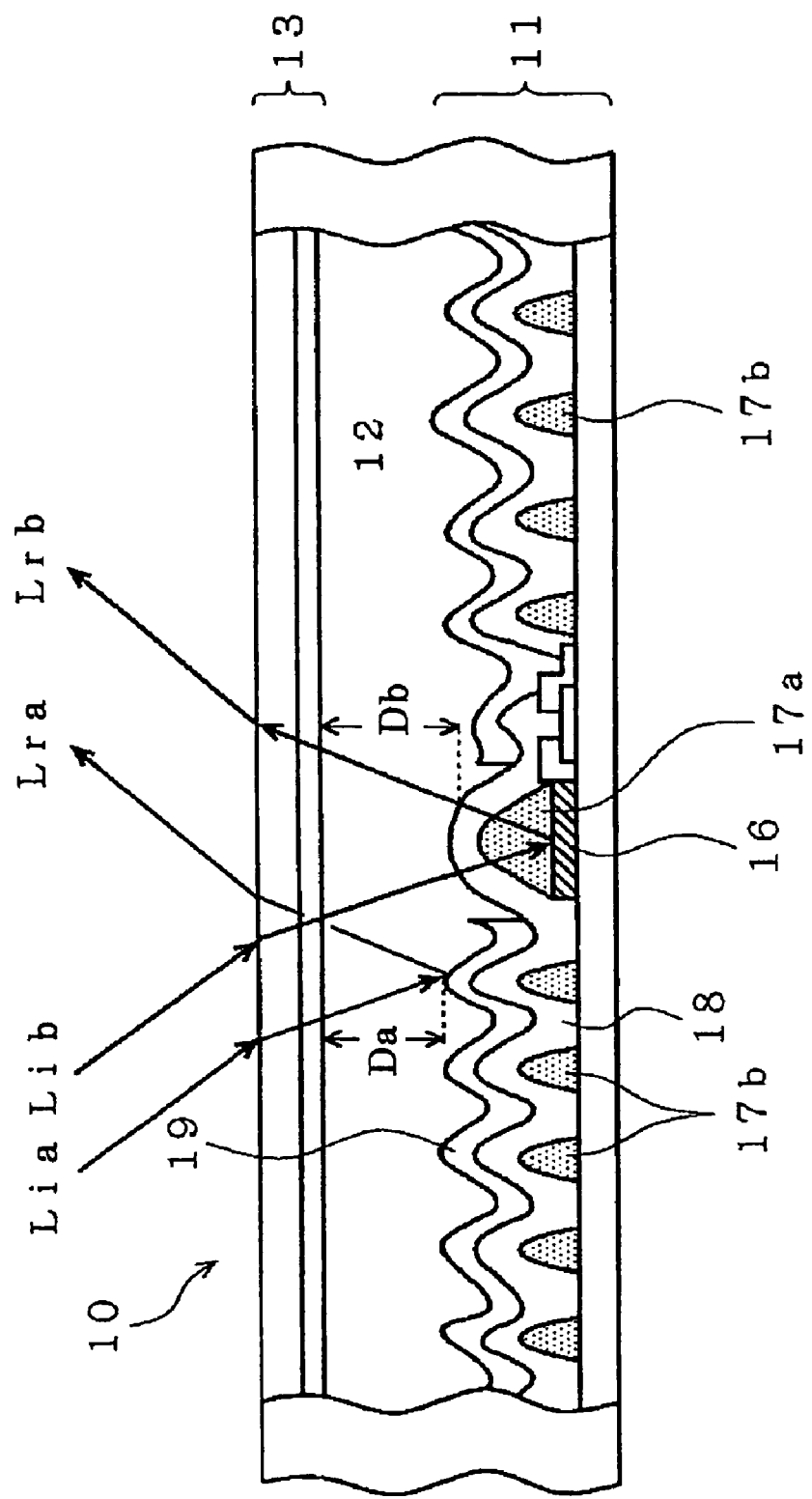
FIG. 5 illustrates how a light is reflected in the liquid crystal display device illustrated in FIG. 3.

As illustrated in FIG. 5, the compensation layer comprised of the first projection 17a and the electrically insulating layer 18 has almost the same height as a height of the reflection electrode 19, wherein a height is measured from a surface of the first substrate 14a. Accordingly, a thickness of the liquid crystal layer 12 between the reflection electrode 19 and the opposing substrate 13 is almost equal to a thickness of the liquid crystal layer 12 between the compensation layer and the opposing substrate 13.

FIG. 5 shows how a light is reflected in the liquid crystal display device 10.

As illustrated in FIG. 5, a first incident light Lia enters the opposing substrate 13, passes through the liquid crystal layer 12, reaches the lower substrate 11, is reflected at the reflection electrode 19, passes the liquid crystal layer 12 again, and leaves the opposing electrode 13 as a reflected light Lra. A second incident light Lib enters the opposing substrate 13, passes through the liquid crystal layer 12, reaches the lower substrate 11, is reflected at the drain wiring 16, passes the liquid crystal layer 12 again, and leaves the opposing electrode 13 as a reflected light Lrb.

The first incident light Lia has a birefringence rate $\Delta n \times Da$ wherein $\Delta n$ indicates an index of refraction of the liquid crystal layer 12 and Da indicates a gap between the reflection electrode 19 and the opposing electrode 13, and the second incident light Lib has a birefringence rate $\Delta n \times Db$ wherein $\Delta n$ indicates an index of refraction of the liquid crystal layer 12 and Db indicates a gap between the compensation layer and the opposing electrode 13.

Figure 1:
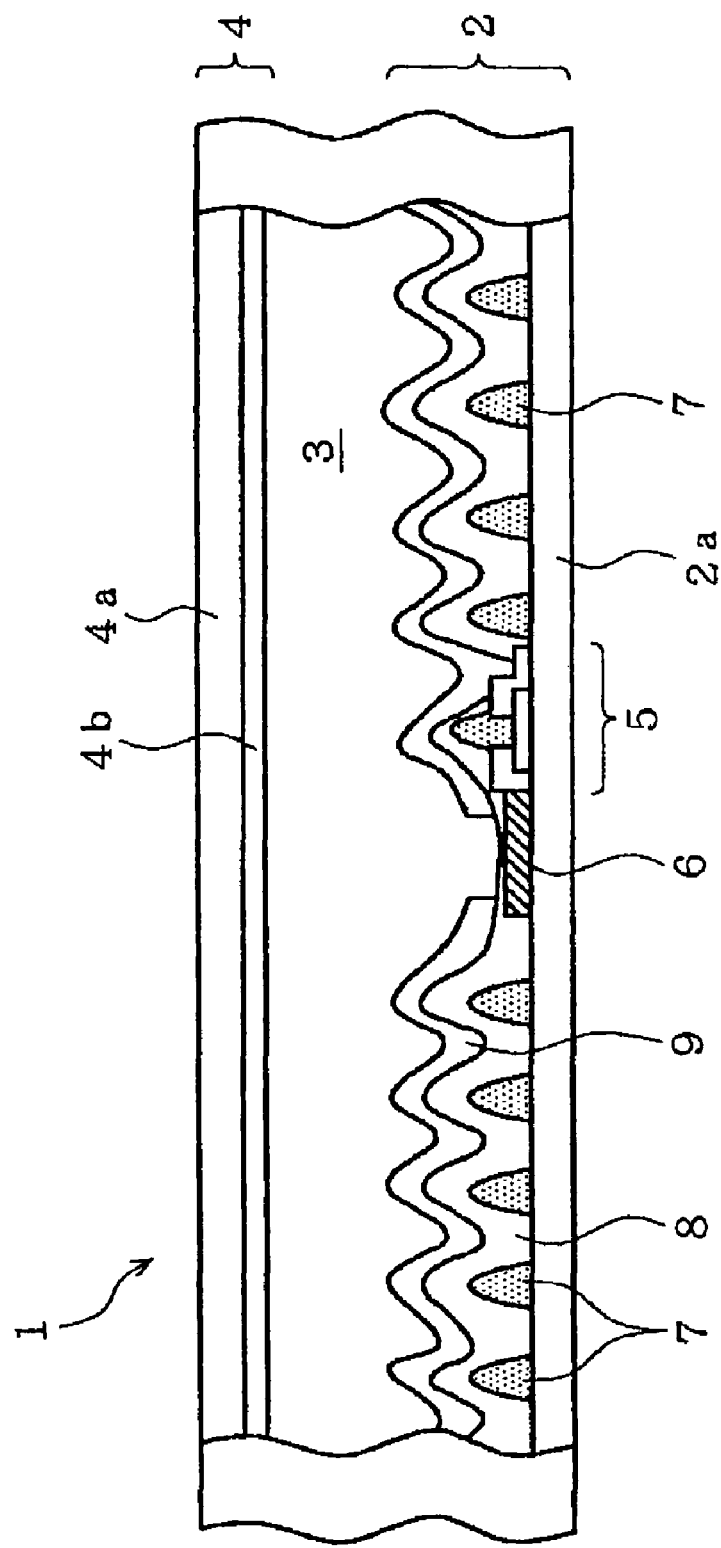
FIG. 1 is a partial cross-sectional view of the conventional liquid crystal display device.
Figure 2:
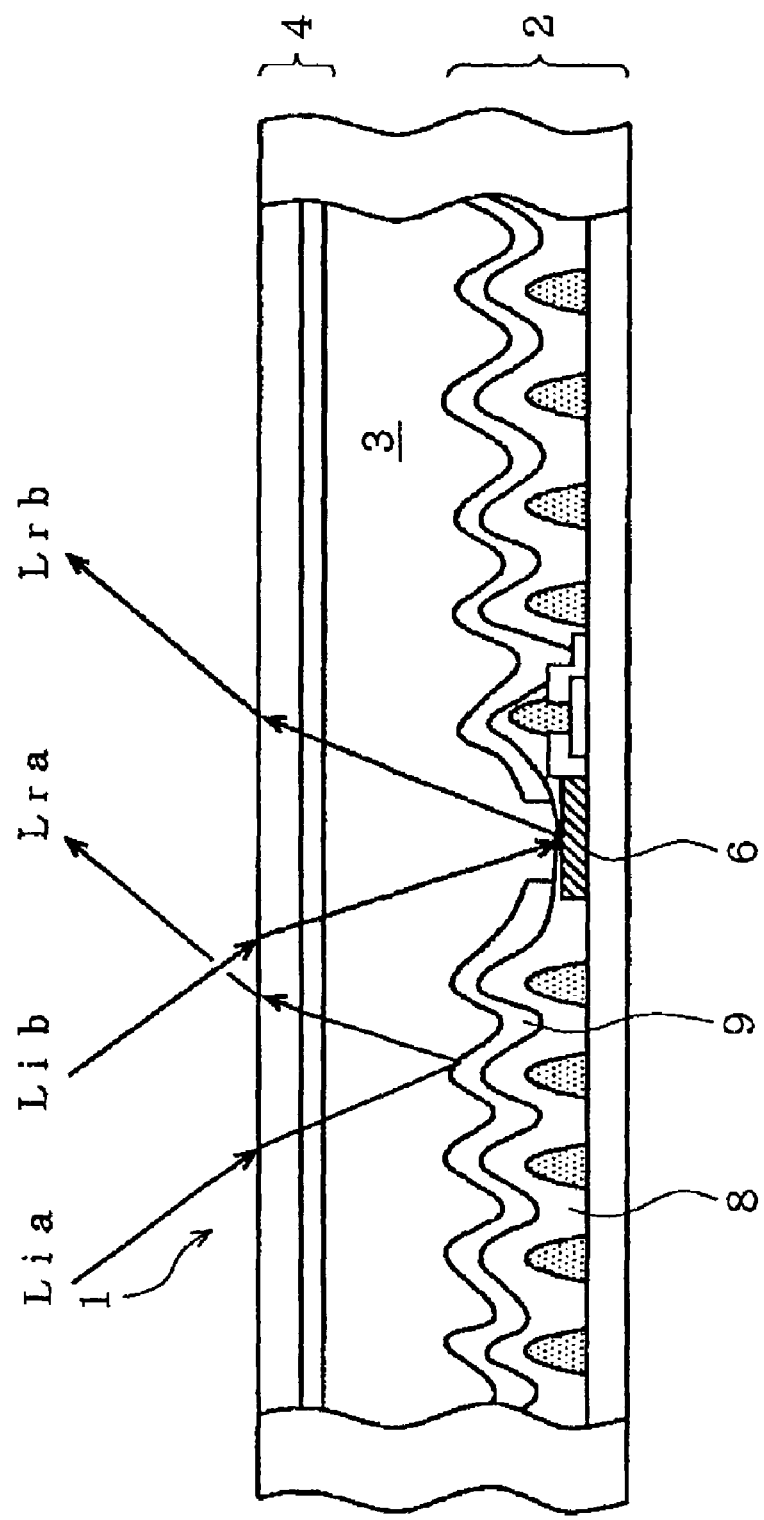
FIG. 2 illustrates how a light is reflected in the conventional liquid crystal display device illustrated in FIG. 1.

As mentioned earlier, the compensation layer has almost the same height as a height of the reflection electrode 19. Accordingly, the gap Da is almost equal to the gap Db. Hence, the first incident light has a birefringence rate $\Delta n \times Da$ almost equal to a birefringence rate $\Delta n \times Db$ of the second incident light Lib, unlike the conventional liquid crystal display device illustrated in FIG. 2 in which the incident light Lia has a different birefringence rate from that of the incident light Lib. As a result, the reflected light Lrb having been reflected at the drain wiring 16 shifts to being bluish from being yellowish, ensuring that a white image displayed in a screen of the liquid crystal display device is prevented from being yellowish.

Figure 6A:
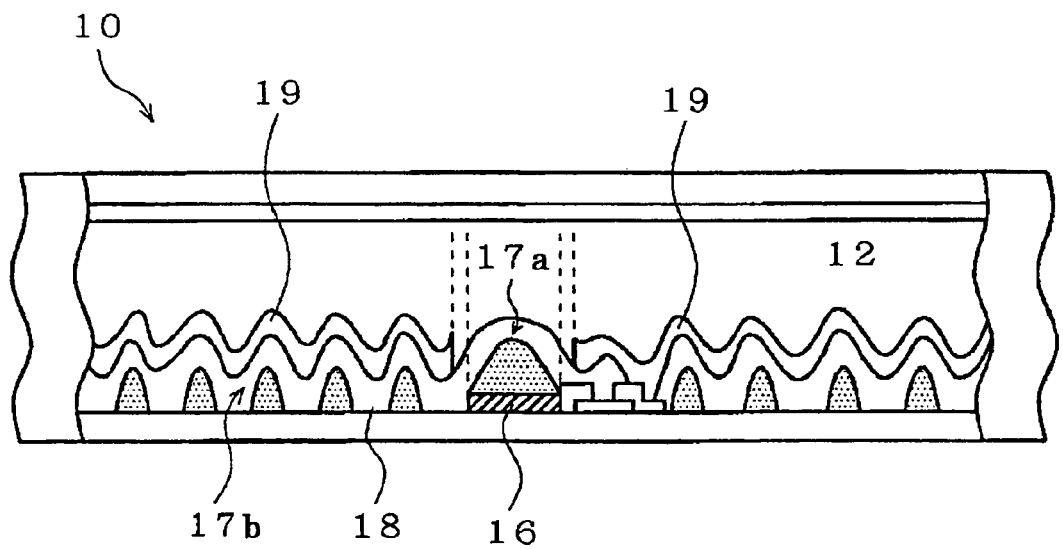
FIG. 6A is a cross-sectional view showing a positional relation between the drain wiring and the reflection electrode in the liquid crystal display illustrated in FIG. 3.

FIG. 6A shows a positional relation between the drain wiring 16 and the reflection electrode 19 in the liquid crystal display device 10.

In the liquid crystal display device 10, as illustrated in FIG. 6A, the reflection electrode 19 is formed on the electrically insulating film 18 such that the reflection electrode 19 does not overlap the drain wiring 16, that is, ends of the reflection electrode 19 are not located above the drain wiring 16. The ends of the reflection electrode 19 are spaced away such that there is a gap between the ends of the reflection electrode 19 and ends of the drain wiring 16, when vertically viewed.

If the reflection electrode 19 overlaps the drain wiring 16, a parasitic capacity defined by the reflection electrode 19 and the drain wiring 16 would be increased, resulting in fluctuation in a pixel voltage. In contrast, in accordance with the liquid crystal display device 10, it is possible to prevent the parasitic capacity from increasing, ensuring prevention of fluctuation in a pixel electrode. Thus, the display characteristic of the liquid crystal display device 10 is not harmfully influenced, even when two drain wirings have the same voltage polarity, for instance, in so-called gate line inversion drive.

Figure 6B:
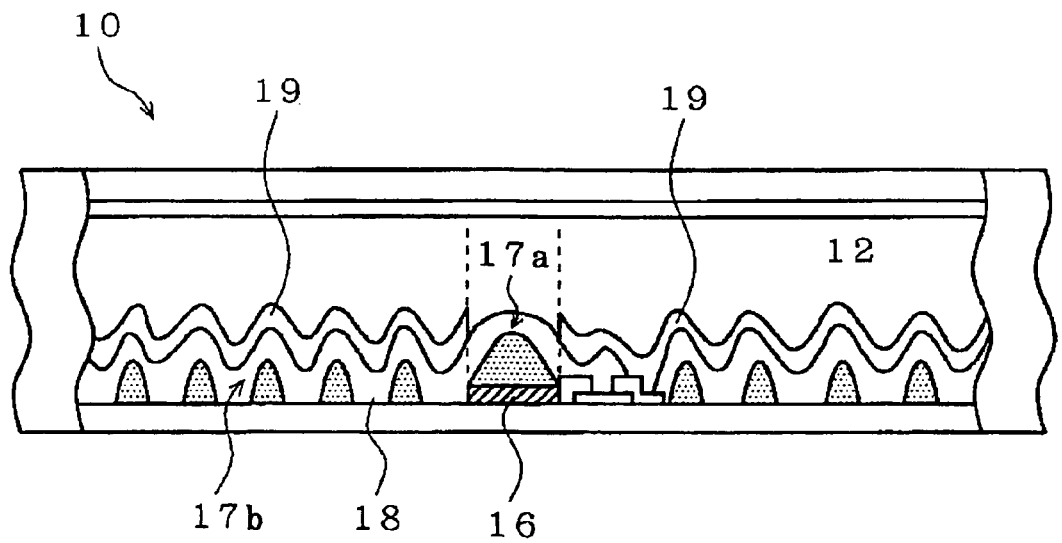
FIG. 6B is a cross-sectional view showing another positional relation between the drain wiring and the reflection electrode in the liquid crystal display illustrated in FIG. 3.

FIG. 6B shows another positional relation between the drain wiring 16 and the reflection electrode 19 in the liquid crystal display device 10.

The reflection electrode 19 may be formed on the electrically insulating film 18 such that the ends of the reflection electrode 19 are located in alignment with the opposite ends of the drain wiring 16, as illustrated in FIG. 6B. As illustrated, this defines an opening within reflection electrode 19 that is in vertical alignment with the first projection.

As an alternative, even if the reflection electrode 19 overlaps the drain wiring 16 at one of the ends thereof, for instance, due to misregistration of a mask for forming the reflection electrode 19, the above-mentioned merit brought by the first embodiment can be obtained, if the reflection electrode 19 does not overlap the drain wiring 16 at the other end.

FIGS. 7A to 7D are cross-sectional views of the liquid crystal display device 10, showing steps to be carried out for fabricating the same.

Figure 7A:
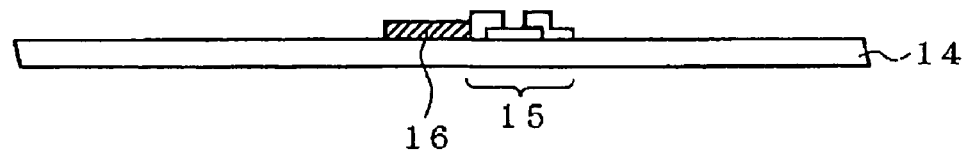
FIGS. 7A to 7D are cross-sectional views showing steps to be carried out in the method of fabricating the liquid crystal display illustrated in FIG. 3.

First, as illustrated in FIG. 7A, the thin film transistor 15 and the drain wiring 16 are formed on the first substrate 14.

Figure 7B:
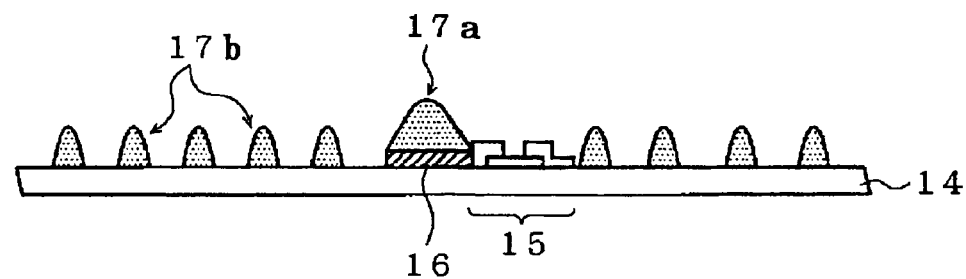

Then, as illustrated in FIG. 7B, the first projection 17a is formed on the drain wiring 16, and the second projections 17b are formed on the first substrate 14. For instance, the first and second projections 17a and 17b may be formed by coating organic resin over the first substrate 14 on which the thin film transistor 15 and the drain wiring 16 have been already formed, applying a photoresist film over the resin, exposing the photoresist film to a light, developing the photoresist film to thereby form a mask, and etching the resin through the mask.

Figure 7C:
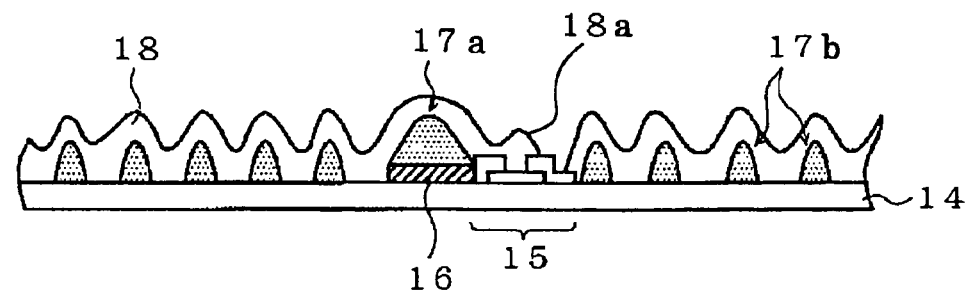

Then, as illustrated in FIG. 7C, the electrically insulating film 18 composed of organic resin is formed so as to cover the first and second projections 17a and 17b, the thin film transistor 15, and the first substrate 14 therewith. Then, the electrically insulating film 18 is formed with the contact hole 18a by photolithography and etching. The contact hole 18a reaches a source electrode of the thin film transistor 15.

The electrically insulating film 18 is formed such that the compensation layer comprised of the first projection 17a and the electrically insulating film 18 is equal to or greater in height than a raised portion of the wavy surface of the reflection electrode 19.

Then, a thin electrically conductive film such as an aluminum film is formed covering the reflection electrode 19 therewith and filling the contact hole 18a therewith.

Figure 7D:
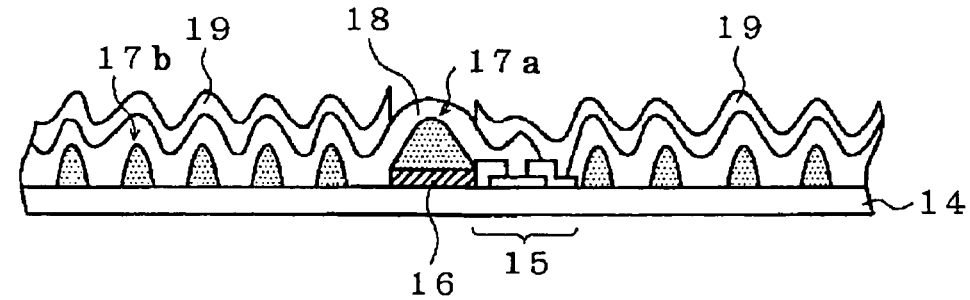

Then, the reflection electrode 19 is formed by carrying out photolithography and etching to the thin electrically conductive film. The reflection electrode 19 is formed so as not to overlap the drain wiring 16, as illustrated in FIG. 7D.

Figure 8A:
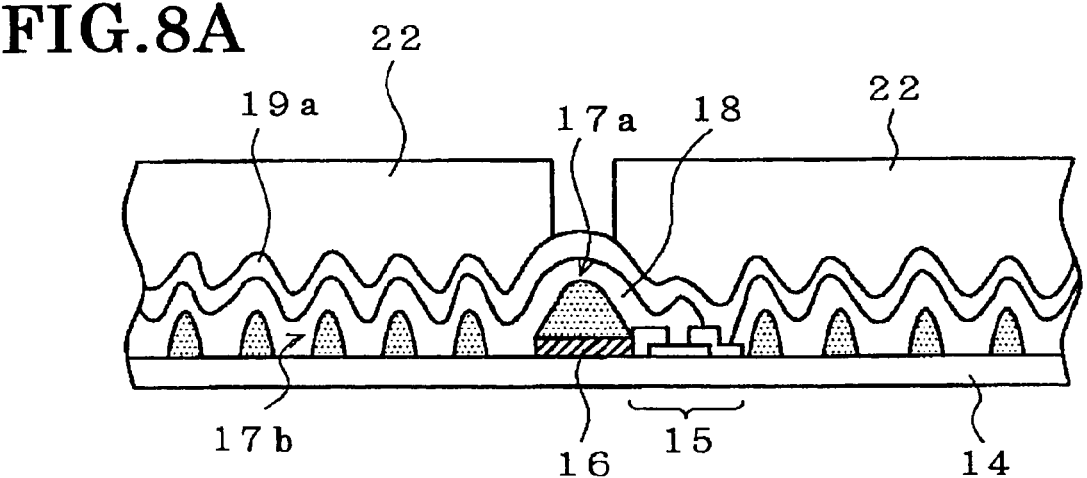
FIGS. 8A and 8B are cross-sectional views showing steps to be carried out for forming the reflection electrode.
Figure 8B:
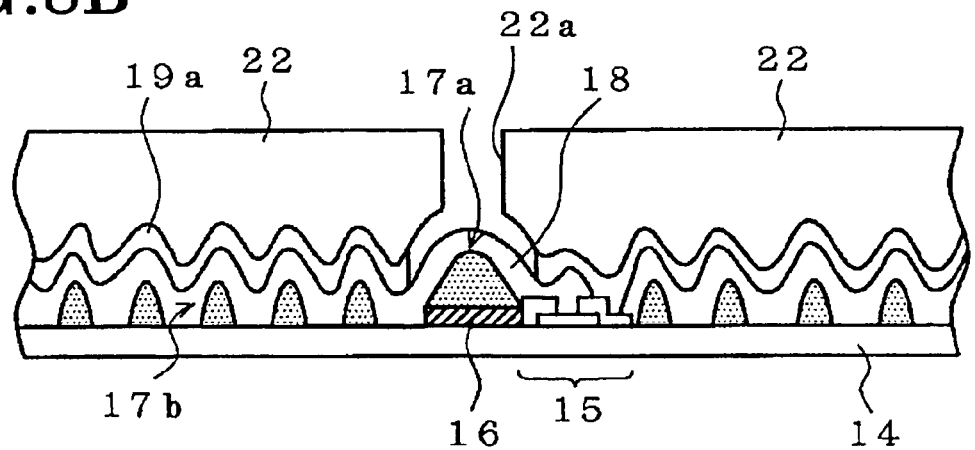

FIGS. 8A and 8B are cross-sectional views of the liquid crystal display device 10, showing steps to be carried out for forming the reflection electrode 19.

First, as illustrated in FIG. 8A, a resist pattern 22 is formed on an aluminum film 19a. Then, the aluminum film 19a is etched for such a period of time that the aluminum film 19a is removed by a length greater than a width of a hole 22a, as illustrated in FIG. 8B. Thus, the reflection electrode 19 can be formed so as not to overlap the drain wiring 16.

Figure 9A:
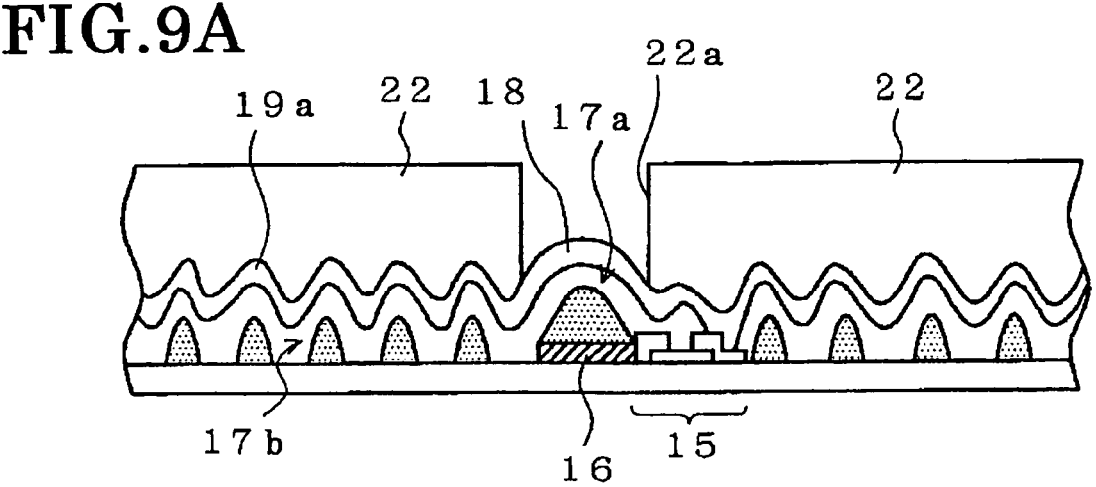
FIGS. 9A and 9B are cross-sectional views showing another steps to be carried out for forming the reflection electrode.
Figure 9B:
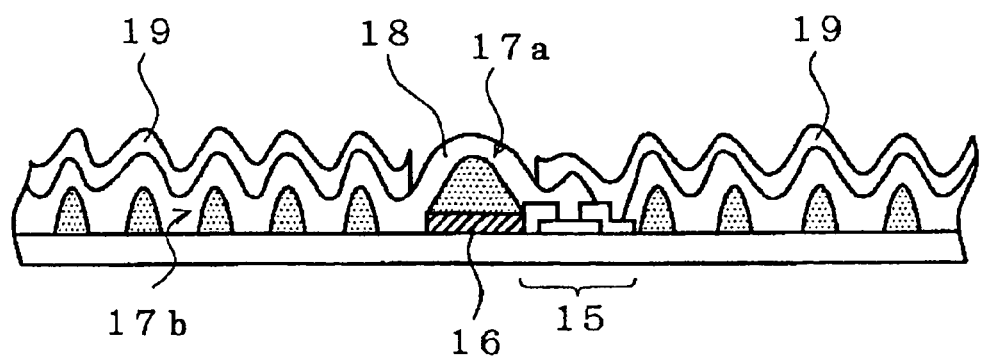

FIGS. 9A and 9B are cross-sectional views of the liquid crystal display device 10, showing another step to be carried out for forming the reflection electrode 19.

As illustrated in FIG. 9A, a resist pattern 22 is formed on an aluminum film 19a. The resist pattern 22 is formed with a hole 22a having a width equal to a length of the drain wiring 16 and located just in alignment with the drain wiring 16. By etching the aluminum film 19a through the resist pattern 22, the reflection electrode 19 can be formed such that the reflection electrode 19 does not overlap the drain wiring 16, as illustrated in FIG. 9B.

The resist pattern 22 may be developed for such a long time that the reflection electrode 19 does not overlap the drain wiring 16, as illustrated in FIG. 9B.

As mentioned above, the compensation layer comprised of the first projection 17a and the electrically insulating film 18 has a height equal to or greater than a height of a raised portion of the wavy surface of the reflection electrode 19. The compensation layer is formed as follows.

Figure 10A:
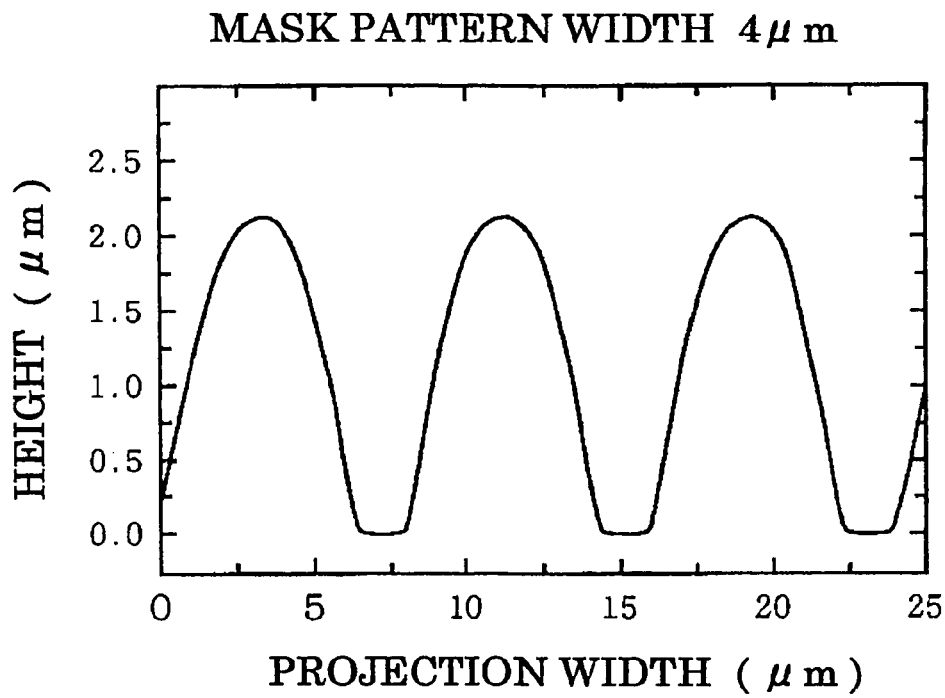
FIG. 10A is a graph showing a relation between a width of a mask pattern and a width of the resultant projection.
Figure 10B:
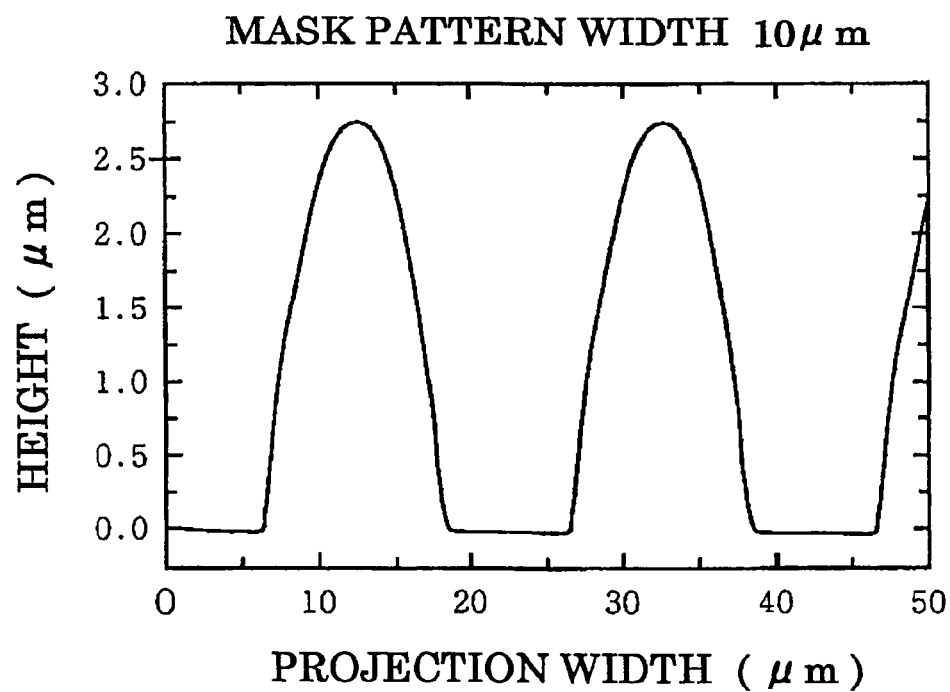
FIG. 10B is a graph showing another relation between a width of a mask pattern and a width of the resultant projection.

FIGS. 10A and 10B show a relation between a width of a mask pattern and a width of the first or second projection 17a or 17b.

As shown in FIG. 10A, if a mask pattern had a width of 4.m, the first or second projection 17a or 17b would have a width of about 7.m and a height of about 2.2. m, and, as shown in FIG. 10B, if a mask pattern had a width of 10.m, the first or second projection 17a or 17b would have a width of about 13.m and a height of about 2.8.m.

That is, greater a width of a mask pattern is, greater a height of the first or second projection 17a or 17b is. Hence, the first projection 17a could have a height greater than a height of the second projections 17b by designing a mask pattern for forming the first projection 17a to have a width greater than a width of a mask pattern for forming the second projections 17b.

When the first and second projections 17a and 17b are to be composed of acrylic resin, the first projection 17a can be designed to have a height equal to or greater than a height of the second projections 17b in the same way as mentioned above.

Wider a line width of a photoresist pattern is, greater a height of a projection composed of acrylic resin is. By utilizing this phenomenon, the first projection 17a could be designed to have a width and a height greater than a width and a height of the second projections 17b.

As mentioned above, the liquid crystal display device 10 in accordance with the first embodiment has such a structure that the electrically insulating film 18 having a rounded summit is formed above the drain wiring 16, that the reflection electrode 19 does not overlap the drain wiring 16, and that the first projection 17a is higher than the second projections 17b.

That is, in the liquid crystal display device 10 in accordance with the first embodiment, the first projection 17a and the electrically insulating film 18 are formed on the drain wiring 16 in order to uniformize an average thickness of the liquid crystal layer 12, and the electrically insulating film 18 is formed above the drain wiring 16 such that the reflection electrode 19 does not overlap the drain wiring 16.

Thus, the electrically insulating layer 18 constituting the compensation layer formed above the drain wiring 16 is formed to have almost the same height as a height of the reflection electrode 19.

In the liquid crystal display device 10, the first projection 17a and the electrically insulating film 18 covering the first projection 17a partially form the wavy surface of the reflection electrode 19, the reflection electrode 19 is formed not to overlap the drain wiring 16, and the electrically insulating film 18 formed above the drain wiring 16 is designed to have almost the same height as a height of the reflection electrode 19.

As a result, as mentioned earlier, it is possible to prevent the reflected light Lrb from being yellowish, and further possible to prevent a white image displayed in a display screen of the liquid crystal display device 10, from being yellowish.

In accordance with the liquid crystal display device 10, it is possible to prevent the parasitic capacity from increasing, ensuring prevention of fluctuation in a pixel electrode. Thus, the display characteristic of the liquid crystal display device 10 is not harmfully influenced, even when two drain wirings have the same voltage polarity, for instance, in the gate line inversion drive.

In the above-mentioned embodiment, though the thin film transistor 15 is used as a switching device, a diode or other switching devices may be used in place of the thin film transistor 15.

In the above-mentioned embodiment, the first projection 17a and the electrically insulating film 18 are formed above the drain wiring 16 in order to equalize the gaps Da and Db (see FIG. 5) to each other. However, the first projection 17a and the electrically insulating film 18 may be formed above another wiring layer to do so.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-343714 filed on Nov. 10, 2000 including specification, claims, drawings and summary is incorporated herein by reference in its entirety.

What is claimed is:

1. A method of fabricating a liquid crystal display device including
   a first substrate;
   a second substrate spaced away from and facing said first substrate;
   a liquid crystal layer sandwiched between said first and second substrates; and
   a reflection electrode formed on said first substrate, an external incident light being reflected at said reflection electrode towards a viewer, said method comprising the steps of:
   (a) forming a switching device and a wiring layer on said first substrate, said wiring layer being electrically connected to said switching device,
   (b) forming a first projection on said wiring layer and second projections on said first substrate;
   (c) covering said first and second projections with an electrically insulating layer;
   (d) forming an electrically conductive film over said electrically insulating layer; and
   (e) patterning said electrically conductive film such that said electrically conductive film does not overlap said wiring layer and said patterned film forms a reflection electrode having an opening in vertical alignment with the first projection,
   wherein said electrically conductive film is formed to have ends located above and in alignment with opposite ends of said wiring layer.

2. The method as set forth in claim 1, wherein said first projection and said electrically insulating layer are formed to have almost the same combined height as a combined height of said second projections, said electrically insulating layer and said electrically conductive film.

3. The method as set forth in claim 1, wherein said electrically insulating layer is formed to have a wavy surface, and said electrically conductive film is formed to have a surface reflecting said wavy surface of said electrically insulating layer.

4. The method as set forth in claim 1, wherein said first projection defines a rectangular frame, and said second projections define a plurality of linear projections each extending in different directions from one another within said rectangular frame.

5. The method as set forth in claim 4, wherein said first projection is formed to have a greater width than a width of said linear projections.

6. The method as set forth in claim 1, wherein said first projection has a height almost the same as a combined height of said second projections and said electrically insulating layer.

7. A method of fabricating a liquid crystal display device including
   a first substrate;
   a second substrate spaced away from and facing said first substrate;
   a liquid crystal layer sandwiched between said first and second substrates; and
   a reflection electrode formed on said first substrate an external incident light being reflected at said reflection electrode towards a viewer, said method comprising the steps of:
   (a) forming a switching device and a wiring layer on said first substrate, said wiring layer being electrically connected to said switching device,
   (b) forming a first projection on said wiring layer and second projections on said first substrate;
   (c) covering said first and second projections with an electrically insulating layer;
   (d) forming an electrically conductive film over said electrically insulating layer; and
   (e) patterning said electrically conductive film such that said electrically conductive film does not overlap said wiring layer and said patterned film forms a reflection electrode having an opening in vertical alignment with the first projection, wherein said step (e) includes the steps of:
   (e1) forming a photoresist layer over said electrically conductive film;
   (e2) forming a hole throughout said photoresist layer above said wiring layer, said hole reaching said electrically conductive film; and (e3) etching said electrically conductive film such that an etched portion of said electrically conductive film has a length greater than a width of said hole, said etched portion forming the opening.

8. A method of fabricating a liquid crystal display device including a first substrate; a second substrate spaced away from and facing said first substrate; a liquid crystal layer sandwiched between said first and second substrates; and a reflection electrode formed on said first substrate, an external incident light being reflected at said reflection electrode towards a viewer, said method comprising the steps of:
(a) forming a switching device and a wiring layer on said first substrate, said wiring layer being electrically connected to said switching device,
(b) forming a first projection on said wiring layer and second projections on said first substrate;
(c) covering said first and second projections with an electrically insulating layer;
(d) forming an electrically conductive film over said electrically insulating layer; and
(e) patterning said electrically conductive film such that said electrically conductive film does not overlap said wiring layer,
wherein said first projection defines a rectangular frame, and said second projections define a plurality of linear projections each extending in different directions from one another within said rectangular frame,
wherein said electrically conductive film is formed to have ends located above and in alignment with opposite ends of said wiring layer.

9. A method of fabricating a liquid crystal display device including a first substrate; a second substrate spaced away from and facing said first substrate; a liquid crystal layer sandwiched between said first and second substrates; and a reflection electrode formed on said first substrate, an external incident light being reflected at said reflection electrode towards a viewer, said method comprising the steps of:
(a) forming a switching device and a wiring layer on said first substrate, said wiring layer being electrically connected to said switching device,
(b) forming a first projection on said wiring layer and forming second projections on said first substrate;
(c) covering said first and second projections with an electrically insulating layer;
(d) forming an electrically conductive film over said electrically insulating layer; and
(e) patterning said electrically conductive film such that said electrically conductive film has ends in alignment above opposite ends of said wiring layer to form a reflection electrode with an opening in vertical alignment with the first projection.

10. The method as set forth in claim 9, wherein said step (e) includes the steps of:
(e1) forming a photoresist layer over said electrically conductive film;
(e2) forming a hole throughout said photoresist layer above said wiring layer, said hole reaching said electrically conductive film; and
(e3) etching said electrically conductive film such that an etched portion of said electrically conductive film has a length greater than a width of said hole, said etched portion forming the opening.

11. The method as set forth in claim 9, wherein said first projection and said electrically insulating layer are formed to have the same combined height as a combined height of said second projections, said electrically insulating layer and said electrically conductive film.

12. The method as set forth in claim 9, wherein said electrically insulating layer is formed to have a wavy surface, and said electrically conductive film is formed to have a surface reflecting said wavy surface of said electrically insulating layer.

13. The method as set forth in claim 9, wherein the ends of said electrically conductive film are located above in vertical alignment with the opposite ends of said wiring layer.

14. The method as set forth in claim 9, wherein said first projection defines a rectangular frame, and said second projections define a plurality of linear projections each extending in different directions from one another within said rectangular frame.

15. The method as set forth in claim 14, wherein said first projection is formed to have a greater width than a width of said linear projections.

16. The method as set forth in claim 9, wherein said first projection has a height the same as a combined height of said second projections and said electrically insulating layer.

* * * * *